US011325648B2

(12) United States Patent
Kim

(10) Patent No.: US 11,325,648 B2
(45) Date of Patent: May 10, 2022

(54) FRONT END MODULE FRAME OF VEHICLE

(71) Applicants: HYUNDAI MOTOR COMPANY, Seoul (KR); KIA MOTORS CORPORATION, Seoul (KR)

(72) Inventor: Do Hoi Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 254 days.

(21) Appl. No.: 16/686,623

(22) Filed: Nov. 18, 2019

(65) Prior Publication Data

US 2020/0353986 A1 Nov. 12, 2020

(30) Foreign Application Priority Data

May 7, 2019 (KR) .................. 10-2019-0053084

(51) Int. Cl.
*B62D 21/15* (2006.01)
*B62D 25/08* (2006.01)

(52) U.S. Cl.
CPC .......... *B62D 21/152* (2013.01); *B62D 25/08* (2013.01); *B62D 25/085* (2013.01)

(58) Field of Classification Search
CPC .... B62D 25/085; B62D 21/152; B62D 25/08; B62D 29/005; B62D 25/082; B62D 21/02; B62D 25/02; B62D 25/081; B60R 19/12; B60Y 2306/01
See application file for complete search history.

(56) References Cited

U.S. PATENT DOCUMENTS

| 4,466,653 A * | 8/1984 | Harasaki | B62D 25/08 280/784 |
| 6,152,521 A * | 11/2000 | Hayashi | B60R 19/24 296/187.09 |
| 6,634,702 B1 * | 10/2003 | Pleschke | B60R 19/18 293/102 |
| 6,893,065 B2 * | 5/2005 | Seksaria | B60K 5/12 293/133 |

(Continued)

FOREIGN PATENT DOCUMENTS

| CN | 106005015 A | 10/2016 | |
| DE | 10042562 A1 * | 3/2002 | ........... B62D 21/152 |

(Continued)

*Primary Examiner* — Paul N Dickson
*Assistant Examiner* — Timothy Wilhelm
(74) *Attorney, Agent, or Firm* — Morgan, Lewis & Bockius LLP

(57) ABSTRACT

A front end module frame may include a cross member, a pair of side members extending from respective end portions of the cross member in a height direction of the vehicle, each of the pair of side members having a center portion connected to the front end portion of a corresponding one of front side members of the vehicle, an upper back beam member interconnecting the upper end portions of the pair of side members, the upper back beam member having opposite end portions respectively connected to the front end portions of upper fender apron members of the vehicle, and a lower back beam member extending in a width direction of the vehicle and interconnecting the center portions of the pair of side members.

16 Claims, 3 Drawing Sheets

(56) References Cited

U.S. PATENT DOCUMENTS

| | | | | |
|---|---|---|---|---|
| 7,008,007 | B2* | 3/2006 | Makita | B60R 19/24 |
| | | | | 280/784 |
| 7,163,243 | B2* | 1/2007 | Evans | B60R 19/12 |
| | | | | 293/121 |
| 7,219,954 | B2* | 5/2007 | Gomi | B62D 21/152 |
| | | | | 296/187.09 |
| 7,802,839 | B2* | 9/2010 | Ajisaka | B60K 1/04 |
| | | | | 296/187.09 |
| 7,850,228 | B2* | 12/2010 | Asai | B62D 21/152 |
| | | | | 296/203.02 |
| 8,047,603 | B2* | 11/2011 | Goral | B62D 29/005 |
| | | | | 296/187.03 |
| 8,118,351 | B2* | 2/2012 | Gonin | B62D 25/084 |
| | | | | 296/193.09 |
| 8,167,361 | B2* | 5/2012 | Riviere | B62D 25/084 |
| | | | | 296/193.09 |
| 8,191,959 | B2* | 6/2012 | Ritz | B62D 25/084 |
| | | | | 296/187.09 |
| 8,267,446 | B2* | 9/2012 | Gonin | B60R 19/12 |
| | | | | 293/136 |
| 8,585,130 | B2* | 11/2013 | Gonin | B60J 5/101 |
| | | | | 296/187.11 |
| 8,596,711 | B2* | 12/2013 | Yasui | B62D 25/082 |
| | | | | 296/187.09 |
| 8,720,961 | B2* | 5/2014 | Han | F16F 7/12 |
| | | | | 293/133 |
| 8,746,761 | B2* | 6/2014 | Haneda | B60R 19/12 |
| | | | | 293/102 |
| 8,764,096 | B2* | 7/2014 | Han | B60R 19/34 |
| | | | | 296/133 |
| 8,789,877 | B2* | 7/2014 | Ohnaka | B62D 25/085 |
| | | | | 296/193.09 |
| 8,911,006 | B2* | 12/2014 | Gillard | B62D 25/08 |
| | | | | 296/193.09 |
| 8,991,907 | B1* | 3/2015 | Kim | B62D 25/08 |
| | | | | 296/193.09 |
| 8,998,300 | B2* | 4/2015 | Lanard | B62D 21/152 |
| | | | | 296/187.09 |
| 8,998,306 | B2* | 4/2015 | Guyomard | B60Q 1/0483 |
| | | | | 296/193.09 |
| 9,004,576 | B2* | 4/2015 | Sakakibara | B62D 25/085 |
| | | | | 296/187.09 |
| 9,016,767 | B2* | 4/2015 | Sotoyama | B62D 21/152 |
| | | | | 296/187.09 |
| 9,120,444 | B2* | 9/2015 | Chung | B60R 19/205 |
| 9,127,968 | B2* | 9/2015 | Cuddihy | B60R 21/0136 |
| 9,211,859 | B1* | 12/2015 | Stoenescu | B62D 25/085 |
| 9,242,675 | B2* | 1/2016 | Kuriyama | B62D 21/152 |
| 9,327,675 | B2* | 5/2016 | Kito | B60R 21/34 |
| 9,365,240 | B2* | 6/2016 | Chang | B62D 21/152 |
| 9,381,941 | B2* | 7/2016 | Segawa | B62D 25/082 |
| 9,446,725 | B2* | 9/2016 | Yamada | B60R 19/34 |
| 9,487,169 | B2* | 11/2016 | Diehl | B62D 27/06 |
| 9,533,714 | B2* | 1/2017 | Riedl | B62D 25/084 |
| 9,539,968 | B2* | 1/2017 | Nishida | B62D 25/082 |
| 9,550,463 | B2* | 1/2017 | Hara | B60R 19/24 |
| 9,555,754 | B2* | 1/2017 | Hara | B62D 21/152 |
| 9,555,756 | B2* | 1/2017 | Sugano | B62D 25/08 |
| 9,586,624 | B2* | 3/2017 | Riedl | B62D 25/085 |
| 9,650,075 | B2* | 5/2017 | Murayama | B62D 25/082 |
| 9,663,050 | B2* | 5/2017 | Nishida | B62D 25/082 |
| 9,676,268 | B2* | 6/2017 | Saeki | B60R 19/12 |
| 9,676,417 | B2* | 6/2017 | Yamada | B60R 19/24 |
| 9,682,674 | B2* | 6/2017 | Corwin | B60R 19/03 |
| 9,701,344 | B2* | 7/2017 | Kodama | B62D 21/152 |
| 9,725,122 | B2* | 8/2017 | Kim | B62D 25/082 |
| 9,731,766 | B2* | 8/2017 | Kim | B62D 21/08 |
| 9,738,319 | B2* | 8/2017 | Hasegawa | B62D 21/152 |
| 9,751,570 | B2* | 9/2017 | Kim | B62D 25/082 |
| 9,764,765 | B2* | 9/2017 | Takeda | B62D 21/152 |
| 9,821,741 | B2* | 11/2017 | Kashiwagi | B62D 21/152 |
| 9,828,032 | B2* | 11/2017 | Watanabe | B62D 25/082 |
| 9,828,037 | B2* | 11/2017 | Alanis | B62D 25/087 |
| 9,834,086 | B2* | 12/2017 | Iwamoto | B60K 11/04 |
| 9,834,160 | B2* | 12/2017 | Staines | B60R 19/023 |
| 9,855,970 | B2* | 1/2018 | Kitakata | B60R 19/12 |
| 9,855,971 | B2* | 1/2018 | Daido | B60R 19/34 |
| 9,855,974 | B2* | 1/2018 | Kase | B60R 19/24 |
| 9,902,430 | B2* | 2/2018 | Sytsma | B62D 25/08 |
| 9,969,432 | B2* | 5/2018 | Matsushima | B62D 25/082 |
| 9,988,100 | B2* | 6/2018 | Kim | B62D 25/082 |
| 10,071,771 | B2 | 9/2018 | Maier | |
| 10,464,609 | B2* | 11/2019 | Ahmed | B62D 25/085 |
| 10,486,745 | B1* | 11/2019 | Kim | B60R 19/18 |
| 10,611,327 | B2* | 4/2020 | Du | B60Q 1/20 |
| 10,864,869 | B2* | 12/2020 | Sato | B60R 19/18 |
| 10,864,871 | B2* | 12/2020 | Tashiro | B62D 25/082 |
| 10,899,395 | B2* | 1/2021 | Yoo | B62D 29/041 |
| 10,913,416 | B2* | 2/2021 | Kurogi | B60R 19/34 |
| 11,046,364 | B2* | 6/2021 | Kim | B62D 25/085 |
| 2005/0067860 | A1* | 3/2005 | Makita | B60R 19/24 |
| | | | | 296/203.02 |
| 2014/0042775 | A1* | 2/2014 | Steinmetz | B60R 19/34 |
| | | | | 296/187.09 |
| 2015/0251613 | A1* | 9/2015 | Mori | B62D 21/152 |
| | | | | 296/187.09 |
| 2021/0162939 | A1* | 6/2021 | Kawamura | B60R 19/34 |
| 2021/0253172 | A1* | 8/2021 | Shimoda | B62D 29/008 |

FOREIGN PATENT DOCUMENTS

| | | |
|---|---|---|
| JP | 2008-143233 A | 6/2008 |
| JP | 4718932 B2 | 7/2011 |
| KR | 10-0352279 B1 | 9/2002 |
| KR | 10-1277861 B1 | 6/2013 |

* cited by examiner

FRONT END MODULE FRAME OF VEHICLE

CROSS-REFERENCE TO RELATED APPLICATION

The present application claims priority to Korean Patent Application No. 10-2019-0053084, filed on May 7, 2019 in the Korean Intellectual Property Office, the entire contents of which is incorporated herein for all purposes by this reference.

BACKGROUND OF THE INVENTION

Field of the Invention

The present invention relates to a front end module frame of a vehicle, which is mounted at the front side of a vehicle to secure parts of the vehicle, and more particularly to a front end module frame of a vehicle, which highly effectively absorbs an impact at the beginning of a collision even in the case of a vehicle having a short front overhang, thereby reducing the peak value of the magnitude of impact which is transferred to the entire vehicle.

Description of Related Art

Recently, personal micro-mobility vehicles have been actively developed due to the expanding use of electric vehicles, social consensus on environmental issues, and the rise of single-person households. However, micro-mobility vehicles are designed to have a very short front overhang, which greatly reduces the space which is used to absorb impact in the event of a collision.

If an impact-absorbing space in a front structure of a vehicle is reduced, most of the impact force caused by a collision is transferred to an occupant, which increases the risk of injury to the occupant.

Theoretically, in the event of a collision of a vehicle, if the impact is sufficiently absorbed at the beginning of the collision, the peak value of the magnitude of the impact transferred to the vehicle during the overall collision process is reduced. Based on the present theory, it is required to reduce the peak value of the magnitude of impact during the collision process to reduce the impact force which is transferred to the occupant.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a front end module frame of a vehicle, which is mounted at the front side of a vehicle to secure parts of the vehicle and also to highly effectively absorb an impact at the beginning of a collision even in the case of a vehicle having a short front overhang, thereby reducing the peak value of the magnitude of impact which is transferred to the entire vehicle.

In accordance with various aspects of the present invention, the above and other objects may be accomplished by the provision of a front end module frame of a vehicle, including a cross member mounted at a front lower side of a vehicle, the cross member extending in a width direction of the vehicle, a pair of side members extending from respective end portions of the cross member in a height direction of the vehicle, each of the pair of side members having a center portion connected to the front end portion of a corresponding one of front side members of the vehicle, an upper back beam member positioned above the cross member in the height direction of the vehicle and extending in the width direction of the vehicle to interconnect the upper end portions of the pair of side members, the upper back beam member having opposite end portions respectively connected to the front end portions of upper fender apron members of the vehicle, and a lower back beam member positioned between the cross member and the upper back beam member in the height direction of the vehicle and extending in the width direction of the vehicle to interconnect center portions of the pair of side members.

The front end portion of each of the front side members may be connected to a rear surface of the center portion of a corresponding one of the pair of side members, and the lower back beam member may be connected to front surfaces of the center portions of the pair of side members.

The front end portion of each of the front side members and a connecting portion of the lower back beam member may be mounted opposite each other, with a corresponding one of the pair of side members interposed therebetween, and may be connected to the corresponding one of the pair of side members, and the lower back beam member and the front side members may form a front load path.

The lower back beam member may include a back beam portion, extending in the width direction of the vehicle, and lower crash boxes, each of the lower crash boxes extending backwards from the back beam part to be connected to a corresponding one of the pair of side members.

The upper end portions of the pair of side members may be connected to the upper back beam member at positions further inward than the front end portions of the upper fender apron members in the width direction of the vehicle.

The upper end portions of the pair of side members may be connected to the lower end portion of the upper back beam member, and the front end portions of the upper fender apron members may be connected to a rear surface of the upper back beam member.

Each of the upper fender apron members may include a front portion, extending in a pillar shape in a longitudinal direction of the vehicle, and a rear portion, extending from the rear end portion of the front portion to gradually increase in cross-sectional area toward a rear side of the vehicle, and the front portion of each of the upper fender apron members may be connected to the upper back beam member.

The front end module frame may further include upper crash boxes connected to the front end portions of the upper fender apron members, and the front end portions of the upper crash boxes may be connected to the upper back beam member.

Each of the upper crash boxes may include an impact-absorbing portion having a pillar shape and a flange portion formed at the rear end portion of the impact-absorbing portion, and the flange portion of each of the upper crash boxes may be connected to the front end portion of a corresponding one of the upper fender apron members.

The upper back beam member may have a smaller height than the flange portion, and the impact-absorbing portion may have a smaller height than the upper back beam member.

A fixing point at which the flange portion of each of the upper crash boxes is connected to a corresponding one of the upper fender apron members may be located to be spaced upwards apart from the upper end portion of each of the upper crash boxes.

The upper crash boxes may be connected to a rear surface of respective end portions of the upper back beam member, and a the rigidity-enhancing bead may be formed on a region between points on the rear surface of the upper back beam member, to which the upper crash boxes are respectively connected.

The upper back beam member may be a metal frame extending in the width direction of the vehicle and may have formed therein an internal space having an open rear surface, the upper crash boxes may be inserted into the internal space of the upper back beam member to be connected thereto, and the rigidity-enhancing bead may be formed in the internal space of the upper back beam member through insert injection molding.

The upper back beam member and the side members may be integrally formed with each other as a metal frame and may have formed therein an internal space having an open rear surface, and the rigidity-enhancing bead may be formed in the internal space of the upper back beam member and the side members through insert injection molding.

The upper back beam member and the lower back beam member may be mounted at the same point in the longitudinal direction of the vehicle while being spaced from each other in the height direction of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
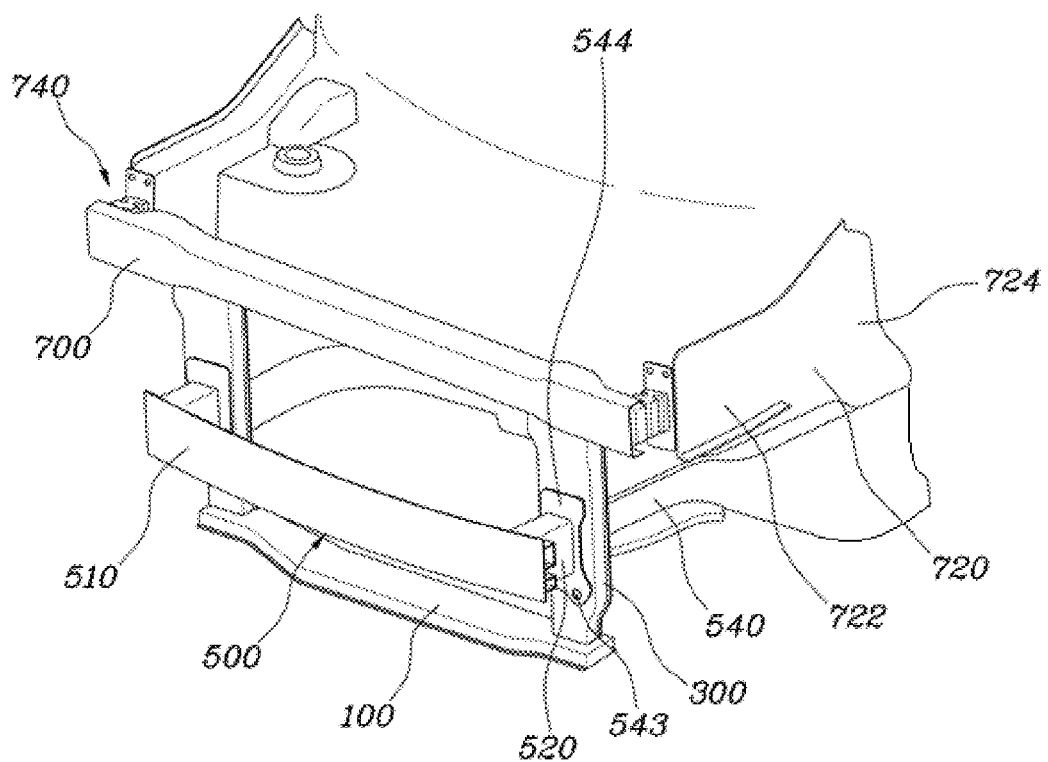
FIG. 1 is a view showing the state in which a front end module frame of a vehicle according to an exemplary embodiment of the present invention is mounted to a vehicle.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Figure 2:
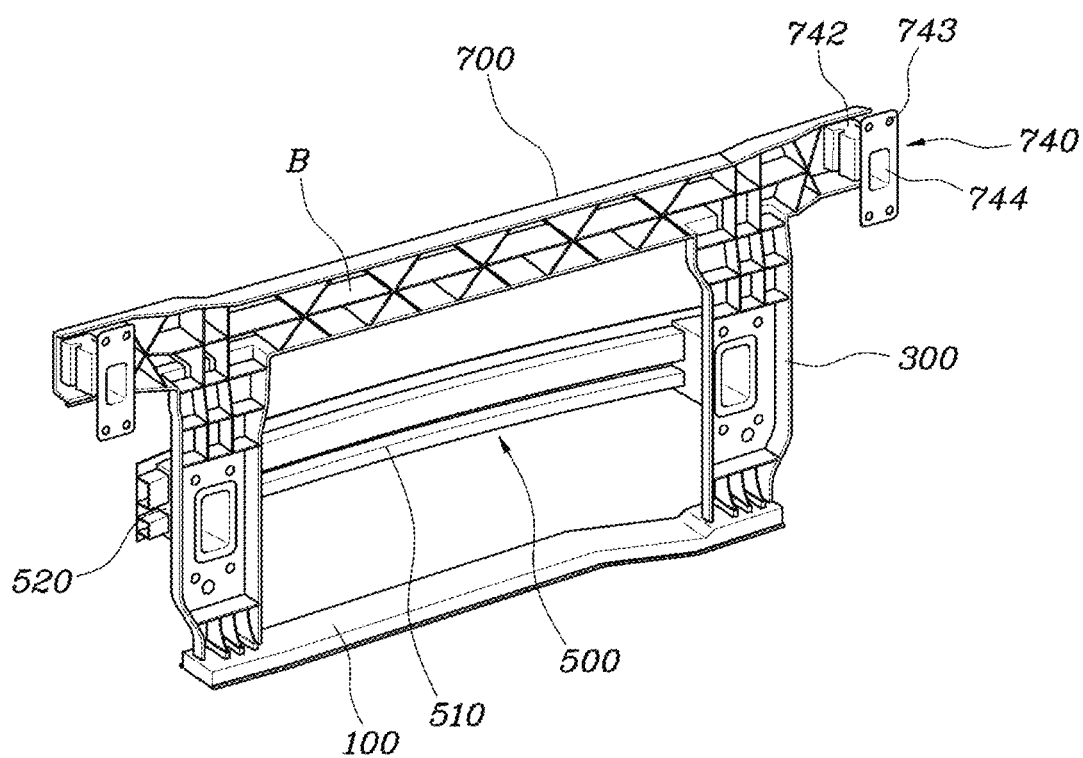
FIG. 2 is a view of the front end module frame of a vehicle according to the exemplary embodiment of the present invention when viewed from the rear.
Figure 3:
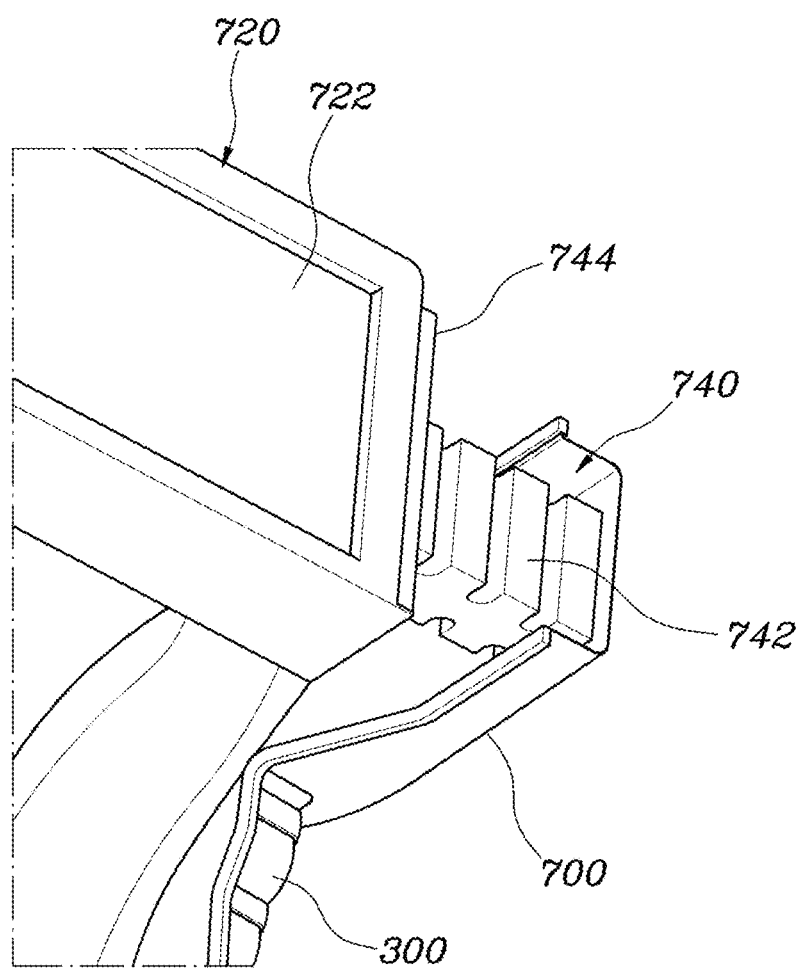
FIG. 3 is a view showing an upper crash box of the front end module frame of a vehicle according to the exemplary embodiment of the present invention.

FIG. 1 is a view showing the state in which a front end module frame of a vehicle according to an exemplary embodiment of the present invention is mounted to a vehicle, FIG. 2 is a view of the front end module frame of a vehicle according to the exemplary embodiment of the present invention when viewed from the rear, and FIG. 3 is a view showing an upper crash box of the front end module frame of a vehicle according to the exemplary embodiment of the present invention.

As shown in FIG. 1, a front end module frame of a vehicle according to an exemplary embodiment of the present invention includes a cross member 100, which is mounted at a front lower side of the vehicle and extends in a width direction of the vehicle, a pair of side members 300, which extend from the respective end portions of the cross member 100 in a height direction of the vehicle and each of which has a center portion connected to the front end portion of a corresponding one of front side members 540, an upper back beam member 700, which extends in the width direction of the vehicle to interconnect the upper end portions of the pair of side members 300 and has opposite end portions respectively connected to the front end portions of upper fender apron members 720, and a lower back beam member 500, which extends in the width direction of the vehicle to interconnect the center portions of the pair of side members 300.

The front end module frame of a vehicle according to the exemplary embodiment of the present invention, constructed as described above, provides excellent impact-absorbing performance when mounted in a micro-mobility vehicle having a very short front overhang. In general, because the front overhang of a micro-mobility vehicle is short, it is not configured for sufficiently absorbing impact in the event of a collision, and thus most of the impact force is transferred to the occupant, additionally causing a large amount of deformation of the passenger compartment.

To solve the present shortcoming, the present invention is configured to absorb as much of an impact as possible using a double-crash-box structure at the beginning of the collision and to securely withstand the front impact using a double-load-path structure on and after the middle of the collision, preventing deformation of the passenger compartment. Furthermore, since a large magnitude of impact is effectively absorbed at the initial stage, the peak value of the magnitude of impact is reduced during the overall collision process, and consequently the peak value which is transferred to the vehicle body and the occupant is reduced.

The present invention realizes impact absorption using a front end module having a structure which is suitable for installation in a micro-mobility vehicle. Therefore, the present invention enables improved impact absorption as well as installation of parts necessary for the vehicle while facilitating a shortened front overhang. A conventional vehicle is constructed such that a front end module, an impact-absorbing structure and a back beam are separately provided. However, according to an exemplary embodiment of the present invention, a front end module, an impact-absorbing structure and a back beam are integrated, thus providing more excellent impact-absorbing performance in the event of a collision.

The front end module frame of the present invention forms a basic frame to which parts of the front end module are mounted via the cross member 100 mounted at the lower side of the vehicle, the pair of side members 300, and the upper back beam member 700 mounted at the upper side of the vehicle.

As shown in FIG. 1, the cross member 100 is mounted at the front lower side of the vehicle and extends in the width direction of the vehicle. The pair of side members 300 extends from the respective end portions of the cross member 100 in the height direction of the vehicle. The center portion of each of the pair of side members 300 is connected to the front end portion of a corresponding one of the front side members 540.

The lower back beam member 500 interconnects the center portions of the pair of side members 300, providing a first front load path, which is defined by the lower back beam member 500 and the front side members 540.

The upper back beam member 700 extends in the width direction of the vehicle, and interconnects the upper end portions of the pair of side members 300. The opposite end portions of the upper back beam member 700 are respectively connected to the front end portions of the upper fender apron members 720. Accordingly, a second front load path, which is defined by the upper back beam member 700 and the upper fender apron members 720, is provided.

That is, the front end module frame according to an exemplary embodiment of the present invention is configured as a structure to which parts of the vehicle are mounted, a back beam, and a load path at the same time. It is possible to effectively absorb impact using the two back beams, namely the lower back beam member 500 and the upper back beam member 700. Furthermore, these two back beams are connected to the front side members 540 and the upper fender apron members 720 to form load paths. With the present configuration, the front end module frame sufficiently is configured as a front support structure of a vehicle in the event of a collision. Thus, it is possible to absorb an impact using the double-back-beam structure at the beginning of a collision and to prevent deformation of the passenger compartment using the double-load-path structure on and after the middle of the collision.

As shown in FIG. 1, the front end portion of each of the front side members 540 may be connected to the rear surface of the center portion of a corresponding one of the pair of side members 300, and the lower back beam member 500 may be connected to the front surfaces of the center portions of the pair of side members 300. The front end portion of each of the front side members 540 and a connecting portion of the lower back beam member 500 are mounted opposite each other, with a corresponding one of the pair of side members 300 interposed therebetween, and are connected to the corresponding side member 300, whereby the lower back beam member 500 and the front side members 540 form a single front load path.

Furthermore, the lower back beam member 500 may include a back beam portion 510, which extends in the width direction of the vehicle, and lower crash boxes 520, each of which extends backwards from the back beam portion 510 to be connected to a corresponding one of the pair of side members 300. With the present configuration, it is possible to absorb as much of an impact as possible and to reduce the peak value of the magnitude of impact at the beginning of the collision.

In an exemplary embodiment of the present invention, the lower crash boxes 520 include a flange portion 544, and a fixing point 543 at which the flange portion 544 is connected to the side members 520 via the fixing point 543.

As shown in FIG. 1 and FIG. 2, the upper end portions of the pair of side members 300 may be connected to the upper back beam member 700 at positions further inward than the front end portions of the upper fender apron members 720 in the width direction of the vehicle. The upper end portions of the pair of the side members 300 are connected to the lower end portion of the upper back beam member 700, and the front end portions of the upper fender apron members 720 may be connected to the rear surface of the upper back beam member 700.

Each of the upper fender apron members 720 includes a front portion 722, which extends in a pillar shape in the longitudinal direction of the vehicle, and a rear portion 724, which extends from the rear end portion of the front portion 722 to gradually increase in cross-sectional area toward the rear side of the vehicle. The front portion 722 of each of the upper fender apron members 720 may be connected to the upper back beam member 700. With the present configuration, the upper fender apron members 720 and the upper back beam member 700 effectively form the front load path. Furthermore, the front portion 722 of each of the upper fender apron members 720, which is a straight-line section, is connected to a corresponding one of upper crash boxes 740 in a straight-line structure, thus facilitating the formation of the effective load path in the event of a head-on collision.

Furthermore, the rear portion 724 of each of the upper fender apron members 720 has a shape in which the cross-sectional area thereof gradually increases toward the rear side of the vehicle, preventing deformation of the passenger compartment to maintain the shape thereof and preventing buckling of the front structure.

The upper crash boxes 740 may be connected to the front end portions of the upper fender apron members 720, and the front end portions of the upper crash boxes 740 may be connected to the upper back beam member 700. Each of the upper crash boxes 740 may include an impact-absorbing portion 742 having a pillar shape and a flange portion 744 formed at the rear end portion of the impact-absorbing portion 742. The flange portion 744 of each of the upper crash boxes 740 may be connected to the front end portion of a corresponding one of the upper fender apron members 720.

Furthermore, as shown in FIG. 1, FIG. 2, and FIG. 3, the upper back beam member 700 may have a smaller height than the flange portion 744, and the impact-absorbing portion 742 may have a smaller height than the upper back beam member 700. A fixing point 743 at which the flange portion 744 is connected to the corresponding upper fender apron member 720 may be located to be spaced upwards apart from the upper end portion of the corresponding upper crash box 740. With the present configuration, as shown in FIG. 2, when the upper crash boxes 740 are first connected to the upper back beam member 700 and are then respectively connected to the front end portions of the upper fender apron members 720 using welding or bolt-fastening through the fixing point 743 of the flange portion 744 of each of the upper crash boxes 740, access using tools and assembly are facilitated.

As shown in FIG. 2, the upper crash boxes 740 may be connected to the rear surface of the respective end portions of the upper back beam member 700, and a rigidity-enhancing bead B may be formed on the region between the points on the rear surface of the upper back beam member 700, to which the upper crash boxes 740 are respectively connected.

The upper back beam member 700 may be a metal frame extending in the width direction of the vehicle, and may have formed therein an internal space having an open rear surface. The upper crash boxes 740 may be inserted into the internal space of the upper back beam member 700 to be connected thereto. The rigidity-enhancing bead B may be formed of a material such as plastic, and may be formed in the internal space of the upper back beam member 700 through insert injection molding.

Alternatively, the upper back beam member 700 and the side members 300 may be integrally formed with each other as a metal frame, and may have formed therein an internal space having an open rear surface. The rigidity-enhancing bead B may be formed in the internal space of the upper back beam member 700 and the side members 300 through insert injection molding. Accordingly, since the upper back beam member 700 and the side members 300 are integrally formed of a single material through a pressing process or the like, the connection strength therebetween is enhanced. Furthermore, since the rigidity-enhancing bead B is formed in the upper back beam member 700 and the side members 300 through insert injection molding, the strength of the members is enhanced.

Furthermore, the upper back beam member 700, which has the rigidity-enhancing bead B formed therein, is coupled to the upper fender apron members 720 as well as the side members 300. These members are mounted at respective appropriate positions without overlapping each other, providing an effective structure for absorbing impact.

Still Furthermore, as shown in FIG. 1, the upper back beam member 700 and the lower back beam member 500 are mounted at the same point in the longitudinal direction of the vehicle while being spaced from each other in the height direction of the vehicle. Thus, the upper back beam member 700 and the lower back beam member 500 may absorb an impact at the same time and may form respective load paths in the event of a head-on collision, preventing buckling or imbalance of the entire frame and the side members 300.

As is apparent from the above description, various aspects of the present invention are directed to providing a front end module frame of a vehicle, which is mounted at the front side of a vehicle to secure portions of the vehicle and also to highly effectively absorb an impact at the beginning of a collision even in the case of a vehicle having a short front overhang, reducing the peak value of the magnitude of impact which is transferred to the entire vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A front end module frame of a vehicle, the front end module frame including:
    a cross member mounted at a front lower side of the vehicle, the cross member extending in a width direction of the vehicle;
    a pair of side members extending from respective end portions of the cross member in a height direction of the vehicle, each of the pair of side members having a center portion connected to a front end portion of a corresponding one of front side members of the vehicle;
    an upper back beam member positioned above the cross member in the height direction of the vehicle and extending in the width direction of the vehicle to interconnect upper end portions of the pair of side members, the upper back beam member having opposite end portions respectively connected to front end portions of upper fender apron members of the vehicle;
    a lower back beam member positioned between the cross member and the upper back beam member in the height direction of the vehicle and extending in the width direction of the vehicle to interconnect center portions of the pair of side members; and
    upper crash boxes connected to the front end portions of the upper fender apron members, wherein front end portions of the upper crash boxes are connected to the upper back beam member.

2. The front end module frame according to claim 1,
    wherein the front end portion of each of the front side members is connected to a rear surface of the center portion of a corresponding one of the pair of side members, and
    wherein the lower back beam member is connected to front surfaces of the center portions of the pair of side members.

3. The front end module frame according to claim 2,
    wherein the front end portion of each of the front side members and a connecting portion of the lower back beam member are mounted opposite each other, with a corresponding one of the pair of side members interposed therebetween, and are connected to the corresponding one of the pair of side members, and
    wherein the lower back beam member and the front side members form a front load path.

4. The front end module frame according to claim 1, wherein the lower back beam member includes:
    a back beam portion, extending in the width direction of the vehicle; and
    lower crash boxes, each of the lower crash boxes extending backwards from the back beam portion to be connected to a corresponding one of the pair of side members.

5. The front end module frame according to claim 4, wherein the lower crash boxes include a flange portion, and a fixing point at which the flange portion of the lower crash boxes is connected to the side members.

6. The front end module frame according to claim 1,
    wherein the upper end portions of the pair of side members are connected to the upper back beam member at positions further inward than the front end portions of the upper fender apron members in the width direction of the vehicle.

7. The front end module frame according to claim 1, wherein the upper end portions of the pair of side members are connected to a lower end portion of the upper back beam member, and
wherein the front end portions of the upper fender apron members are connected to a rear surface of the upper back beam member.

8. The front end module frame according to claim 1, wherein each of the upper fender apron members includes:
   a front portion, extending in a pillar shape in a longitudinal direction of the vehicle; and
   a rear portion, extending from a rear end portion of the front portion to increase in cross-sectional area toward a rear side of the vehicle, and
wherein the front portion of each of the upper fender apron members is connected to the upper back beam member.

9. The front end module frame according to claim 1, wherein each of the upper crash boxes includes an impact-absorbing portion having a pillar shape and a flange portion formed at a rear end portion of the impact-absorbing portion, and
wherein the flange portion of each of the upper crash boxes is connected to the front end portion of a corresponding one of the upper fender apron members.

10. The front end module frame according to claim 9, wherein the upper back beam member has a smaller height than the flange portion, and
wherein the impact-absorbing portion has a smaller height than the upper back beam member.

11. The front end module frame according to claim 9, wherein a fixing point at which the flange portion of each of the upper crash boxes is connected to a corresponding one of the upper fender apron members is located to be spaced apart from the upper crash boxes.

12. The front end module frame according to claim 1, wherein the upper crash boxes are connected to a rear surface of respective end portions of the upper back beam member, and
wherein a rigidity-enhancing bead is formed on a region between points on the rear surface of the upper back beam member, to which the upper crash boxes are respectively connected.

13. The front end module frame according to claim 12, wherein the upper back beam member is a metal frame extending in the width direction of the vehicle and has formed therein an internal space having an open rear surface,
wherein the upper crash boxes are inserted into the internal space of the upper back beam member to be connected thereto, and
wherein the rigidity-enhancing bead is formed in the internal space of the upper back beam member through insert injection molding.

14. The front end module frame according to claim 12, wherein the upper back beam member and the side members are integrally formed with each other as a metal frame and have formed therein an internal space having an open rear surface, and
wherein the rigidity-enhancing bead is formed in the internal space of the upper back beam member and the side members through insert injection molding.

15. The front end module frame according to claim 1, wherein the upper back beam member and the lower back beam member are mounted at a same point in a longitudinal direction of the vehicle while being spaced from each other in the height direction of the vehicle.

16. The front end module frame according to claim 1, wherein the cross member is positioned further inward than the lower back beam member toward a rear side of the vehicle in a longitudinal direction of the vehicle.

* * * * *